Oct. 7, 1924.

E. VARÉ

ACCUMULATOR ELECTRODE

Filed Feb. 17, 1922

1,510,617

Inventor:
Emile Varé
By
Attorney.

Patented Oct. 7, 1924.

1,510,617

UNITED STATES PATENT OFFICE.

EMILE VARÉ, OF BRUSSELS, BELGIUM.

ACCUMULATOR ELECTRODE.

Application filed February 17, 1922. Serial No. 537,275.

*To all whom it may concern:*

Be it known that I, EMILE VARÉ, a subject of the King of Belgium, residing at Brussels, Belgium, have invented certain new and useful Improvements in Accumulator Electrodes, of which the following is a specification.

This invention relates to a positive accumulator electrode by which the phenomena of osmosis may be applied by means of a porous cell surrounding the active material.

As is well known, the active material (lead oxide) of the positive electrodes increases in volume by loading the accumulator. The use of a porous cell in such an electrode presents therefore difficulties with regard to the pressure produced by the expansion of the active material, effecting often the splitting of the porous cell.

The present invention has for its object to overcome these difficulties, and it consists essentially in providing spaces in the inside of the porous cell for permitting the expansion corresponding to the increase in the volume of the active material.

In order to produce the spaces for permitting the expansion corresponding to the increase in the volume of the active material, the electrode according to this invention may be provided with a corrugated plate which is disposed between the porous cell and the active material.

The metallic conductor or conductor proper may also have a cross-sectional shape such that it can be compressed by the action of the pressure due to the increase in the volume of the active material, and the hollow metallic conductor may also be filled with an elastic and compressible material.

Figure 1:
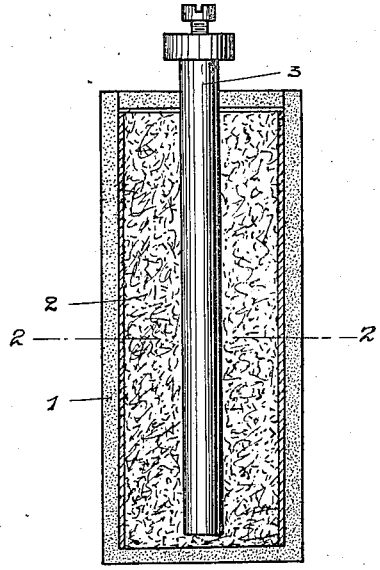
Figure 3:
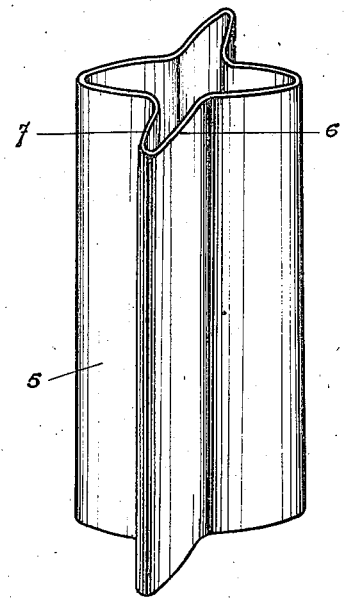
Figure 2:
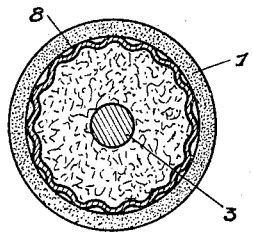
Figure 4:
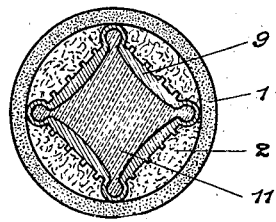

Referring to the drawings, Fig. 1 is a vertical sectional view of an electrode embodying the invention; Fig. 2 is a cross section on line 2—2 of Fig. 1; Fig. 3 shows a hollow metallic conductor having the special star section; Fig. 4 is a cross section of an electrode having a hollow metallic conductor of another form.

As shown in Figs. 1 and 2, the porous cell 1 contains the active material 2 and the conductor proper 3, the latter being disposed axially within the porous cell. The said cell is provided with a resilient part consisting of a corrugated plate 8 disposed between the porous cell and the active material 2.

The resilient part may also be constituted by the conductor proper itself. Fig. 3 shows a conductor of that kind which is hollow and has a special star section. By the effect of compression resulting from the expansion of the active material, the sides 6 and 7 of the branches or arms of the star are brought nearer to each other and compensate for the expansion in that way.

Fig. 4 shows an electrode having a compressible metallic conductor 9 disposed in the porous cell 1 with the active material 2. In order to permit the conductor to return to its original shape when the pressure of the material ceases, the conductor 9 is filled with an elastic and compressible material 11 such as gutta-percha, rubber or the like.

When such an electrode is embedded in the active material it becomes compressed as soon as the volume of the active material increases, and the elastic and compressible material 11 enables it to return to its original form after the pressure of the active material ceases.

Having thus described my invention, what I claim as new and desire to secure by Letters Patent, is—

1. An accumulator electrode, comprising a hollow, porous cell; active material therein; and flexible means disposed in the cell to provide spaces therewithin to be filled by said material during its expansion; said means being flexed by the pressure imposed thereagainst by such expansion and automatically resuming normal form when said pressure is relieved.

2. An accumulator electrode, comprising a hollow, porous cell; active material therein; and a flexible, metallic conductor disposed within the cell and adapted to be compressed uniformly by the pressure imposed thereagainst by the expansion of the active material, so as to provide spaces within the cell to be filled by said material during its expansion; said conductor automatically resuming normal form when said pressure is relieved.

3. An accumulator electrode, comprising a hollow, porous cell; active material therein; and a flexible, metallic conductor disposed within the cell and having a star section; said conductor adapted to be compressed uniformly by the pressure imposed against it by the expansion of the active material, so as to provide spaces within the cell to be filled by said material during its expansion, and automatically resuming normal form when said pressure is relieved.

4. An accumulator electrode, comprising a hollow, porous cell; active material therein; and a hollow, flexible metallic conductor disposed in the cell and containing a filling of compressible elastic material; said conductor adapted to be compressed uniformly by the pressure exerted against it by the active material during its expansion and to automatically resume its normal form under the action of said elastic material when such pressure is relieved.

5. An accumulator electrode, comprising a hollow, porous cell; active material therein; and a hollow, flexible metallic conductor disposed in the cell and containing a filling of compressible elastic material; said conductor having a star section and adapted to be compressed uniformly by the pressure exerted against it by the active material during its expansion and to automatically resume its normal form under the action of said elastic material when such pressure is relieved.

In testimony whereof I affix my signature.

EMILE VARÉ.

Witnesses:
 LEONARD HEVO,
 ALPHONSE CHILL.